United States Patent Office 2,771,147
Patented Nov. 20, 1956

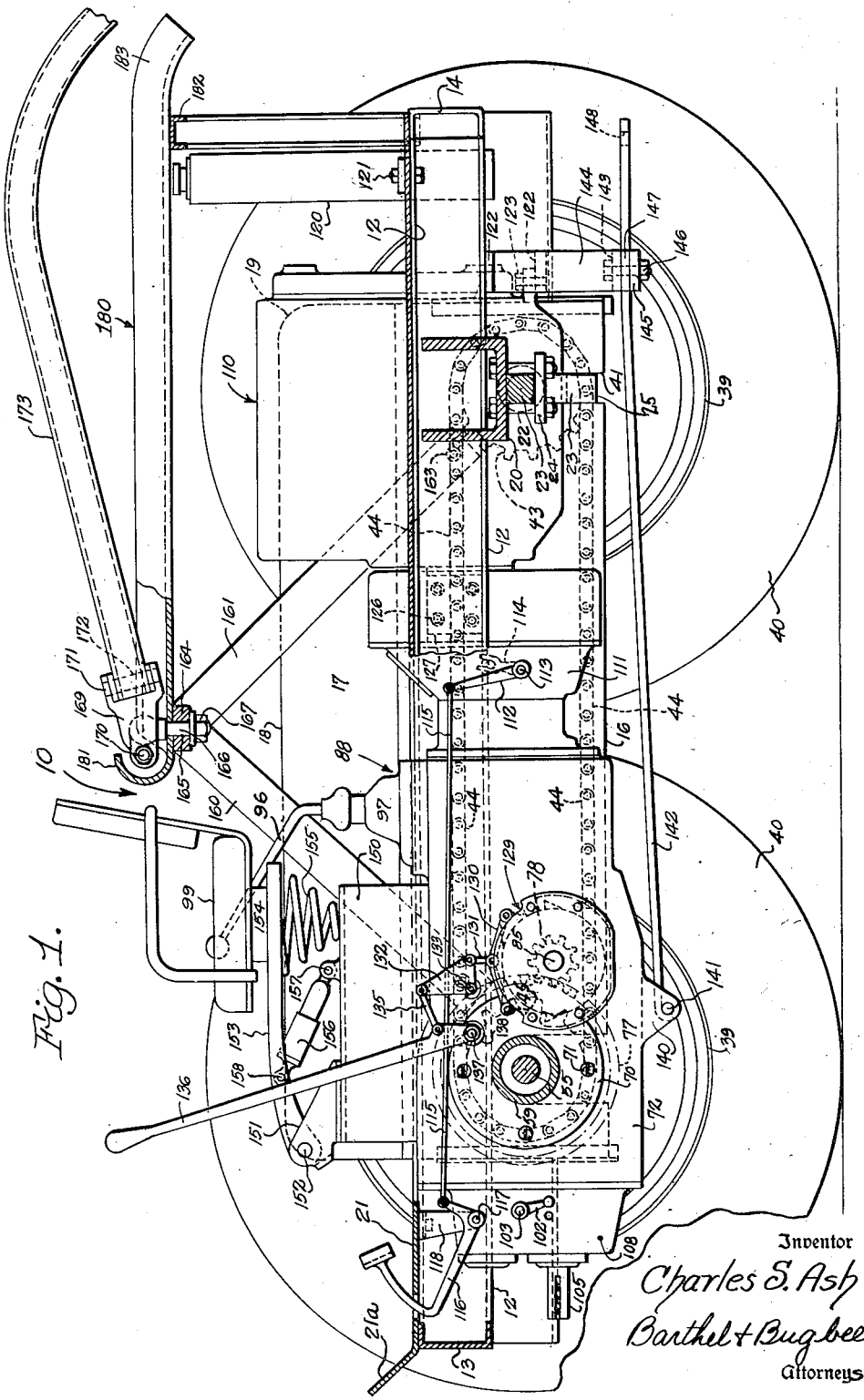

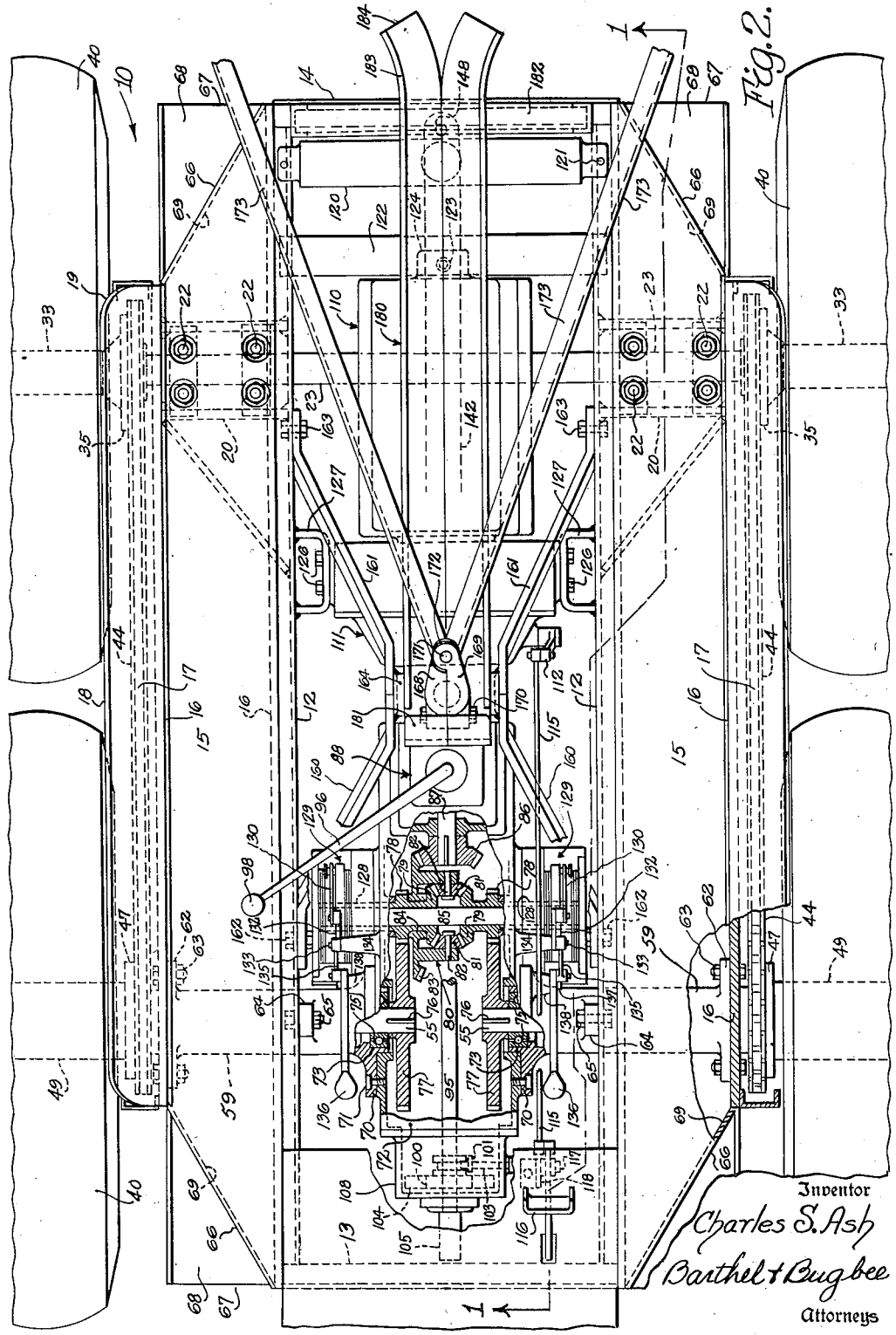

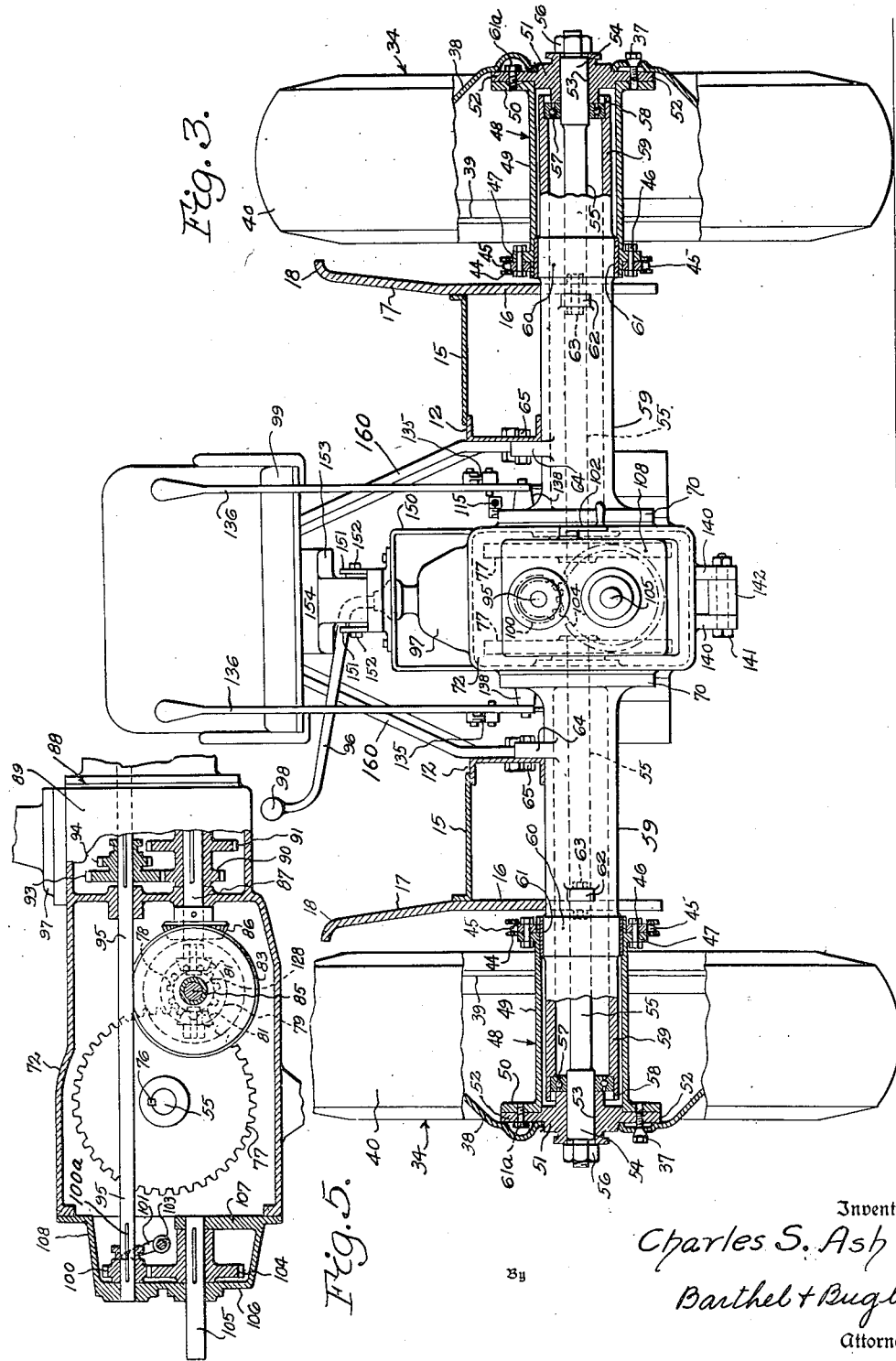

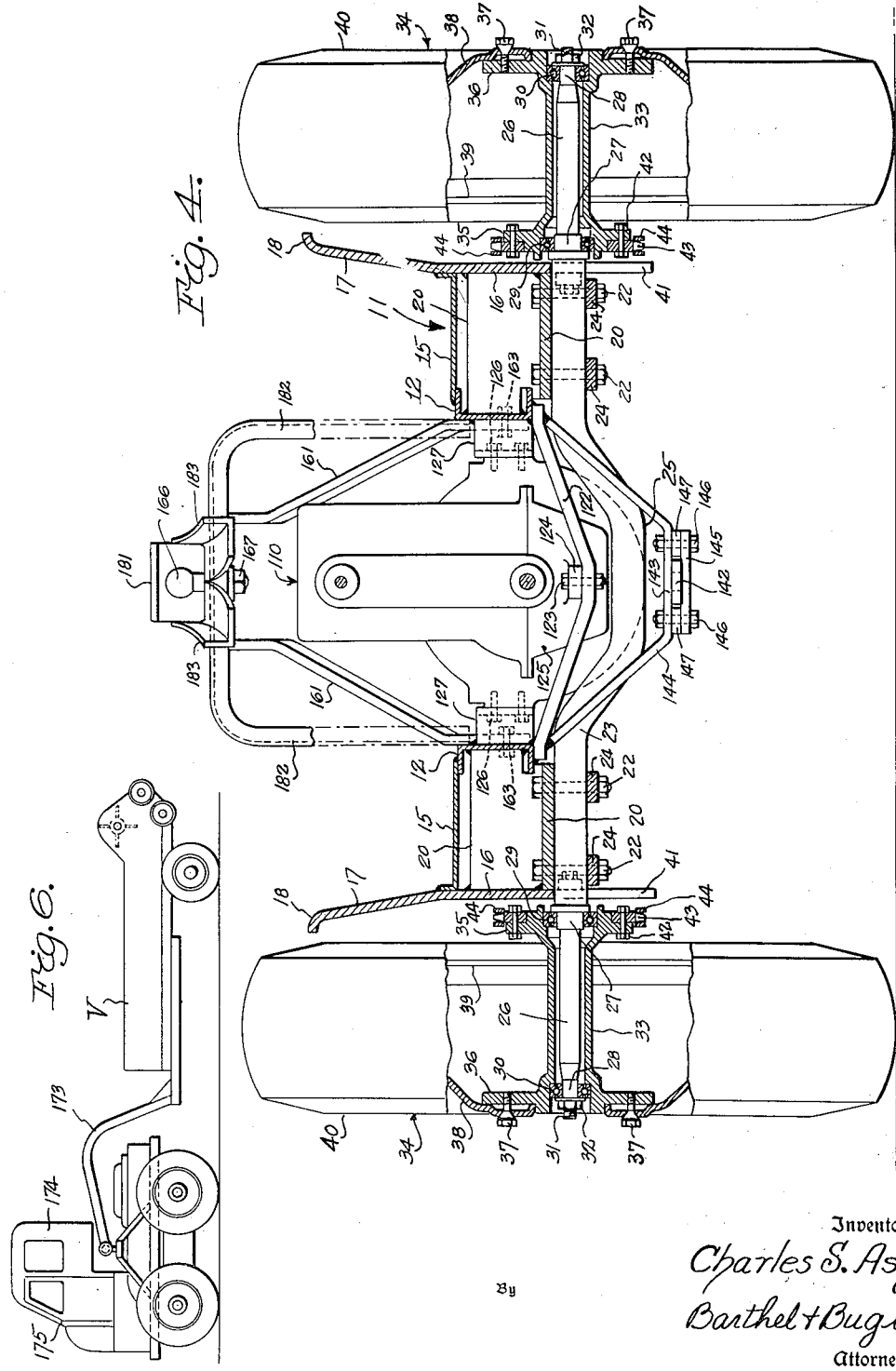

2,771,147

FOUR-WHEEL DRIVEN TRACTOR

Charles S. Ash, Detroit, Mich.

Application May 18, 1950, Serial No. 162,617

2 Claims. (Cl. 180—49)

This invention relates to self-propelled vehicles, and in particular to tractors.

One object of this invention is to provide a tractor having both its forward and rearward wheels positively driven from the engine by an improved power-transmitting mechanism which provides maximum traction and less slippage than has hitherto been obtained from conventional tractors.

Another object is to provide a tractor wherein the load is connected to a coupling device located in the central part of the tractor so as to apply the load to the tractor at a location between its front and rear wheels, thereby giving a more efficient connection of the load to the vehicle.

Another object is to provide a tractor in which the front wheels are driven from an engine located in the rearward portion of the tractor through a suitable transmission, the rear wheels being driven from the front wheels by way of power-transmitting devices mounted on the front axle.

Another object is to provide a tractor having improved structural framework so constructed and arranged as to provide greater rigidity and substantial freedom from weaving or frame distortion when the tractor is traveling over very uneven ground, thereby also eliminating axle deflection and consequently reducing accidents and increasing the life of the tractor with greater safety of operation.

Another object is to provide a tractor in which the steering is accomplished by braking one of the front wheels while driving the other front wheel, the steering brake levers being mounted adjacent the driver's seat which is located near the central or forward end of the tractor so as to provide greater visibility and ease of control.

Another object is to provide a tractor of the foregoing character wherein the steering of the tractor is accomplished by braking a countershaft from which the wheels are driven at a step-down speed ratio, thereby facilitating steering by reason of the stepped-up speed of the brake drums compared with the reduced speed of the wheels.

In the drawings:

Figure 1 is a longitudinal section through a tractor according to one form of the invention, taken along the line 1—1 in Figure 2, with the coupling guide broken away to show the coupling arrangement more clearly;

Figure 2 is a top plan view of the tractor shown in Figure 1, with the transmission gear box and frame partly broken away to show the driving arrangement more clearly;

Figure 3 is a front elevation of the tractor shown in Figures 1 and 2, partly in section along the plane of the front axle center line;

Figure 4 is a rear elevation of the tractor shown in Figures 1 to 3 inclusive, partly in section along the plane of the rear axle center line;

Figure 5 is an approximately central vertical section through the transmission gear box of the tractor shown in Figures 1 to 4 inclusive; and Figure 6 is a side elevation of the tractor of Figures 1 to 5 inclusive, showing a trailer coupled thereto.

Referring to the drawings in detail, Figures 1 to 4 inclusive show a tractor, generally designated 10, according to one form of the invention, as including a main frame structure, generally designated 11, so constructed as to minimize weaving and axle deflection when the tractor 10 is traversing uneven ground or when one wheel passes over a hump. The main frame structure 11 includes a pair of parallel channel members 12 (Figures 3 and 4) having their flanges facing outward away from one another and tied together at their forward and rearward ends by cross channel members 13 and 14 respectively. Spaced apart from the channel members 12 and connected thereto by the elongated floor plates 15 by welding or other suitable fastening arrangement are two elongated approximately vertical plates 16, the upper portions 17 of which are bent outwardly away from one another and terminate in rounded upper edge portions 18 with rounded corners 19. The plates 16 together with the channel members 12 and floor plates 15 form a rigid framework, the rigidity of which is increased by the presence of a pair of short channel members 20 which are arranged transversely (Figure 1) with their flanges facing upward, and welded at their opposite ends to the channel 12 and plates 16 respectively. The floor plates 15 at their forward ends are also interconnected by a foot plate 21 having an upturned forward portion 21a.

Bolted as at 22 to the transverse channel members 20 is a rear axle 23 of approximately square cross-section, clamping plates or bars 24 interconnecting each pair of bolts 22. The central portion 25 of the rear axle 23 is dipped in an approximately shallow U-shaped formation so as to pass beneath the engine, as described below. The rear axle 23 is a "dead" axle in that it does not rotate, but its outer end portions 26 are of circular cross-section and are provided with annular surfaces 27 and 28 which receive the inner races of inner and outer anti-friction bearing units 29 and 30 respectively (Figure 4). The outer ends of the axle portions 26 are threaded as at 31 to receive retaining nuts 32. Rotatably mounted on the anti-friction bearings 29 and 30 are the tubular hubs 33 of rear wheels, generally designated 34. The hubs 33 have inner and outer flanges 35 and 36 respectively, the outer flange 36 being drilled and threaded to receive bolts 37 by which the wheel discs 38 are secured to the hubs 33. The wheel discs 38 at their peripheries terminate in the usual rims 39 upon which conventional tires 40 are mounted. The side plates 16 are slotted as at 41 to receive the axles 23, so that the plates 16 extend downward below the axles 23.

Bolted or otherwise suitably secured as at 42 to the inner flange 35 of each rear wheel hub 33 is a sprocket wheel 43 (Figure 4) which is drivingly connected by a sprocket chain 44 to a sprocket 45 (Figure 3) which is bolted as at 46 to the inner flange 47 of a tubular front wheel hub, generally designated 48 and including a sleeve 49 with a flange 50. The hub 49 also includes a driving disc 51. The outer flange 50 and driving disc 51 are bored and threaded to receive bolts 37 by which the wheel discs 38 of front wheels 34 are secured to the flanges 52 of the discs 51 and flanges 50 of the sleeve 49 (Figure 3). The front wheels 34 are similar to the rear wheels 34 and are similarly provided with rims 39 carrying tires 40.

The driving disc 51 is bored centrally as at 53 to receive the outer end portion 54 of a live axle 55 and held in place by a retaining nut 56 threaded upon the outer end thereof. The shaft portion 54 is rotatably supported by an anti-friction bearing 57 (Figure 3) mounted in a counterbore 58 in the outer end of the tubular front axle housing 59. The latter is provided with an annular boss or enlargement 60 adjacent the plate 16 and provided with a plain or anti-friction bearing 61 for rotatably supporting the inner end of the sleeve 49 immediately beneath the sprocket wheel 45. Bolts 61a hold the flanges 50 and 52 together.

Each front axle housing 59, of which there are two, is provided with lugs 62 (Figures 2 and 3) by which it is bolted as at 63 to the adjacent plate 16. The front axle housings 59 are also provided with upwardly extending lugs 64 which are bolted as at 65 to the channel members 12. In this manner, the front axle housings 59 are firmly and rigidly made a part of the frame structure including the channel members 12, floor plates 15, side plates 16 and channel members 20. By reason of this construction, axle deflection is reduced to a minimum and most of the weaving characteristic of ordinary tractors is prevented, such weaving occurring, for example, when one of the wheels 34 passes over a hummock or into a depression in the path of travel. The floor plates 15 at their opposite ends are cut away along an inclined edge 66 to provide a step 67 having a tread 68 and riser 69 welded to the floor plates 15. The steps 67 assist the operator in entering or leaving the machine.

The inner ends of the front axle housings 59 are annularly flanged as at 70 (Figures 2 and 3) and bolted as at 71 to a transmission housing 72 of box-like form. The inner ends of the front axle housings 50 are counterbored as at 73 to receive anti-friction bearings 75 which rotatably support the inner ends of the live axle 55, each axle 55 being provided with a spline or keyway 76 (Figure 2) to drivingly receive a gear 77. The gears 77 are spaced apart from one another on opposite sides of the interior of the transmission on housing 72. The gears 77 in turn mesh with pinions 78, the hubs of which carry bevel gears 79 integral therewith forming a part of the differential, generally designated 80. The bevel gears 79 are spaced apart from one another and mesh with common bevel pinions 81 mounted on pins or stub shafts 82 carried by and projecting axially from a bevel gear 83 which is bored as at 84 to loosely and rotatably receive the hub of one of the gears 78. It will be obvious that the gear 78 whose hub carries the bevel gear 83 may be separately attached to its respective bevel gear 79 rather than integral therewith, in order to facilitate assembly.

The bevel gear 83 and the hubs of the gears 78 and 79 are loosely and rotatably mounted upon a shaft 85 which is mounted inside these gears so as to support them. The bevel gear 83 meshes with a bevel pinion 86 which is keyed or otherwise drivingly secured to the output shaft 87 of a change speed gear set 88 having a housing 89 which is a continuation of the transmission housing 72 (Figure 5). The output shaft 87 is journaled in the opposite end walls of the housing 89 and carries conventional gears 90, 91 splined or keyed thereto and meshing with conventional sliding gears 93, 94 mounted on an input shaft 95 which is also journaled in the end walls of the gear set housing 89. The change speed gear set 88 is shown only in part because it is conventional and well-known in the automotive industry. The gears 93, 94 are shifted to and fro along the shaft 95 by being connected to a shift lever 96 mounted in the cover 97 of the housing 89. The lever 96 is moved to and fro by the operator in an H-shaped path in order to change speed or place the mechanism in neutral, as is well known to those skilled in the automotive engineering art. The lever 96 terminates in a ball 98 located adjacent the driver's seat 99 for the convenience of the operator.

In order to provide a power takeoff arrangement, a sliding gear 100 is splined or keyed as at 100a to the forward end of the shaft 95 (Figure 5) and annularly grooved to be engaged by a shift yoke 101 operated by a hand lever 102 mounted on a shaft 103 (Figures 1 and 5) so as to be moved into and out of mesh with a gear 104 which is keyed or splined to the power takeoff shaft 105. The latter is journaled in the spaced walls 106 and 107 of a front closure member 108 in the side walls of which the shaft 103 is also journaled. The other end of the shaft 105 carries any suitable power-transmitting device, such as a pulley or sprocket, by which the power of the machine can be used for operating other machinery.

The shaft 95 is driven by an internal combustion engine, generally designated 110, by way of a conventional clutch (not shown) within a clutch housing 111. The clutch is shifted into and out of driving relationship to drivingly connect or disconnect the engine 110 from the shaft 95 by means of a shift lever 112 mounted on a shaft 113 (Figure 1) which is journaled in the fly wheel and clutch housing 111. The shaft 113 inside the clutch housing 111 carries a clutch shifting yoke 114 for shifting the clutch into and out of driving engagement. The clutch shift lever 112 is operated by an operating rod 115 pivotally connected thereto at its rearward end and at its forward end pivotally connected to a clutch pedal 116 approximately in the form of a bell-crank lever. The clutch pedal 116 is pivotally mounted as at 117 on a bracket 118 secured to and extending downwardly from the foot plate 21 (Figure 1). Consequently, when the operator depresses the foot pedal 116, it shifts the lever 112 to throw the clutch out of engagement in the usual way.

The engine 110 is shown diagrammatically since it is conventional, the fan, water pump, generator, starting motor and other accessories being omitted for simplicity of showing. The engine 110 is equipped with the usual cooling radiator 120 which is bolted as at 121 to the channel members 12 near the rearward ends thereof. The engine 110 is mounted upon an approximately V-shaped cross member 122 which is welded or otherwise secured to the channel members 12, the engine 110 being bolted thereto as at 123 to the cross member 122 by means of a lug 124 extending axially from the crankcase or pan 125 (Figure 4). The engine 110 is additionally supported by having the clutch housing 111 bolted as at 126 to U-shaped brackets 127 (Figure 2), the free ends of which are welded to the webs of the channel members 12.

In order to steer the vehicle, each of the paired gears 78 and 79 (Figure 2) is provided with an outwardly extending tubular hub 128 which is drivingly connected to one side of a conventional brake, generally designated 129, the opposite side of which is connected to toggle links 130. The latter are pivotally connected at their inner ends to a link 131 (Figure 1) which in turn is pivotally connected to a bell crank lever 132 pivotally mounted at 133 upon a bracket 134 projecting outwardly from the side of the transmission housing 72 (Figure 2). The bell crank lever 132 is in turn pivotally connected by a link 135 to a hand lever 136, the lower end of which is pivotally mounted as at 137 on the bracket 138 projecting outward from the transmission housing 72. The brake units 129 are of any suitable type, different types of brakes being capable of use. A brake suitable for this purpose and adapted to engage equally well whether the vehicle is moving forward or rearward is shown in my previous Patent No. 2,300,532 issued November 3, 1942 for Dual Wheel Assembly. By applying one of the brakes 129 by its hand lever 136, one of the axles 55 can be halted, causing the wheel 34 which it drives to halt, whereupon the opposite axle 55 and wheel 34 will be driven from the output shaft 87 through the differential 80 at an increased rate of speed, causing a rapid turning of the vehicle toward the side which is braked, as explained in connection with the operation.

Extending downward from the bottom of the transmission housing 72 (Figures 1 and 3) are spaced ears 140 supporting a pivot bolt 141 to which is secured the forward end of a draw bar 142, the rearward portion of which passes beneath the central portion 143 of an approximately V-shaped downwardly-extending bracket or cross member 144 (Figure 4), the upper ends of which are welded to the cross member 122 or to the channel members 12, as preferred. The draw bar 142 is retained in position by a plate 145 which is bolted as at 146 through spacers 147 to the central portion 143 of the cross member 144. The draw bar 142 at its rearward end is provided with a hole 148 to which towed vehicles or equipment may be connected.

The driver's seat 99 is mounted upon a channel-shaped base 150, the lower ends of which are welded or otherwise suitably secured to the transmission housing 72. Spaced ears 151 secured to and rising from the base 150 carry a pivot bolt 152 which pivotally supports the forward end of a swinging seat support 153, the rearward end of which carries a member 154 upon which the driver's seat 99 is mounted. One or more coil springs 155 is provided for absorbing shock, and these shocks are snubbed or dampened by a shock absorber or damper 156, the opposite ends of which are pivotally connected as at 157 and 158 to the base 150 and seat support 153 respectively.

In order to provide a centrally located connection for the attachment or coupling of a towed vehicle, forward and rearward struts 160 and 161 are bolted or otherwise secured as at 162 and 163 at their lower ends to the channel members 12, and extend upward to a common junction with a bar or plate 164 to which they are welded or otherwise suitably secured. The bar or plate 164 is bored as at 165 to receive a ball-headed bolt 166, the lower end of which carries a nut 167 by which it is anchored in position. Engageable with the ball-headed coupling bolt 166 are fixed and movable coupling jaws 168 and 169 which are held together by a bolt 170 at their forward ends and pivoted as at 171 at their rearward ends to the junction 172 of a pair of tow bars 173 which extend forward from the vehicle V to be towed (Figure 6). The vehicle V may be any towed vehicle, or piece of equipment, such as an argicultural machine, farm trailer or the like, and its details form no part of the present invention. For the sake of simplicity the tractor 10 in Figures 1 to 4 inclusive is shown as having the driver's seat out in the open. It will be obvious that a cab 174 as shown in Figure 6, may be mounted on the tractor 10 so as to provide a shelter for the driver, access being obtained by means of doors 175.

In order to guide the coupling jaws 168 and 169 at the ends of the towing bars 173 into coupling engagement with the coupling bolt 166, a channel-like guide structure, generally designated 180, is mounted on the tractor 10, the forward end being upturned as at 181 and secured by the bolt 166 to the bar 164. The rearward end of the guide structure 180 is supported by an inverted U-shaped bracket 182 of channel cross-section (Figures 1 and 4), the lower ends of which are welded or otherwise secured to the channel members 12. The rearward ends of the L-shaped members 183 of which the guide structure 180 is composed, are flared outward as at 184.

*Operation*

In the operation of the invention, let it be assumed that the tow bars 173 of the vehicle V to be towed are coupled to the coupling bolt 166 in the manner shown, and that the vehicle is standing idle with the gear shift lever 96 in its neutral position and with the brake levers 136 in their off positions. With the engine 110 running, in order to propel the tractor 10 in a forward direction, the operator shifts the gear shift lever 96 into its usual low gear position, operating the clutch pedal 116 in the ordinary manner. Power is then transmitted from the engine 110 through the change speed gear set 88 and differential 80 (Figure 2) to the gears 77 on the live front axles 55, driving these axles and causing the front wheels 34 to rotate in a forward direction. The consequent rotation of the front wheel hubs 48 by the live axles 55 causes the sprocket wheels 45 mounted thereon to rotate (Figure 3), and these in turn propel the rear wheels 34 by means of the engagement of the sprocket chains 44 with the sprocket wheels 43 on the rear wheel hubs 33 (Figure 4), thus driving the rear wheels.

To turn the vehicle, for example to the right, the operator pulls upward on the right-hand brake lever 136, braking the right-hand gears 78, 79 and consequently halting the right-hand gear 77 and right-hand axle 55. As a consequence, the right front wheel 34 halts, whereupon power is transmitted through the differential 80 from the bevel gear 86 to the left-hand gear 77 mounted on the left-hand live axle 55 (Figure 2) by way of the bevel gear 83 and left-hand pinion 78. This causes the left-hand live axle 55 to rotate, turning the left-hand front wheel 34 and causing the tractor 10 to turn to the right. To turn in the opposite direction, the operator pulls up on the left-hand brake lever 136 and releases the right-hand brake lever 136, causing the left front wheel 34 to be halted and the right front wheel 34 to be driven, turning the tractor 10 to the left.

To halt the tractor completely, the operator pulls both levers 136 upward simultaneously, halting both front wheels 34 and thereby retarding or halting the tractor 10, as desired. The tractor 10 may be reversed or driven backward by operating the gear shift lever 96 to place the change speed gear set 88 in its reverse position. The use of the brakes 129 will, of course, also be made for steering when the tractor is moving backward. If the left-hand front wheel 34 is braked while the tractor 10 is in reverse, the consequent rotation of the right front wheel 34 will move the tractor 10 backward to the left, assuming the directions according to an operator seated in the driver's seat 99. If the brake 129 disclosed in the Ash Patent No. 2,300,532 of November 3, 1942 is employed, it has an equally efficient braking action, regardless of whether the tractor 10 is traveling forward or backward.

Since the tractor 10 is driven through its four wheels 34, the engine torque is applied more evenly and smoothly to the ground as compared with conventional tractors in which only two wheels are driven. Axle deflection is substantially eliminated due to the rigid construction of the axle housings 50 which are tied together near the wheels 34 by their connection to the side plates 16, the floor plates 15 and the channel members 12 and 20. Consequently, even though one of the wheels 34 goes over a hummock or into a depression, the axle is not deflected and the frame is prevented from weaving. Since the operator's seat 99 is located in the forward central portion of the tractor, the operator is able to manipulate the tractor and the towed vehicle very efficiently and is also able to observe the operation of all implements very clearly. Since the towing load is applied at a substantially central portion of the tractor, namely at the ball-headed bolt 166, the wheels 34 are more evenly loaded and the traction more evenly applied to all four wheels than is the case when the towed vehicle V is connected to the rear of the tractor 10, such as to the rearward end of the draft bar 142. It is preferable, for this purpose, to mount the bar or plate 164 constituting the coupling rest midway between the axles 23 and 55, as shown in Figure 1.

The wheel supporting and driving arrangement shown at the opposite ends of Figure 3 enhances the strength of the wheel mounting, provides improved support for the wheels, and reduces wear. This results from the fact that the hub disc 51 and live axle 55 are rotatably supported not only by the anti-friction bearing 57 but also by the sleeve 49 and the bearing 61 mounted on the axle housing portion 60. The bearing 61 also provides bearing support for sustaining the thrust brought about by the pull of the sprocket chains 44 upon the sprockets 45.

What I claim is:

1. A self-propelled wheeled tractor vehicle comprising a main frame structure, a hollow forward wheel support mounted forwardly on said main frame structure, a rearward wheel support mounted rearwardly on said main frame structure in longitudinally-spaced relationship with said hollow forward wheel support, a wheel hub loosely and rotatably mounted on each end of each wheel support, ground-engaging wheels mounted on said hubs, an axle rotatably mounted in said hollow wheel support and drivingly connected at its outer ends to the wheel hubs mounted thereon, an engine mounted rearwardly on said frame structure, power-transmitting mechanism extending forwardly from said engine to said axle and drivingly connecting said engine to said axle, toothed driving members mounted on and fixedly secured to said hubs, and a plurality of endless flexible driving elements, each element extending between and engaging the corresponding longitudinally-spaced driving members secured to the associated hubs.

2. A self-propelled wheeled tractor vehicle comprising a main frame structure, a hollow forward wheel support mounted forwardly on said main frame structure, a rearward wheel support mounted rearwardly on said main frame structure in longitudinally-spaced relationship with said hollow forward wheel support, a wheel hub loosely and rotatably mounted on each end of each wheel support, ground-engaging wheels mounted on said hubs, an axle rotatably mounted in said hollow wheel support and drivingly connected at its outer ends to the wheel hubs mounted thereon, an engine mounted rearwardly on said frame structure, power-transmitting mechanism extending forwardly from said engine to said axle and drivingly connecting said engine to said axle, toothed driving members mounted on and fixedly secured to said hubs, a plurality of endless flexible driving elements, each element extending between and engaging the corresponding longitudinally-spaced driving members secured to the associated hubs, and an operator's seat mounted forwardly on said frame structure above said hollow forward wheel support.

References Cited in the file of this patent

UNITED STATES PATENTS

| Number | Name | Date |
|---|---|---|
| 639,237 | Hirsch | Dec. 19, 1899 |
| 700,786 | Kull | May 27, 1902 |
| 1,083,134 | Prettyman | Dec. 30, 1913 |
| 1,084,820 | Pescatore | Jan. 20, 1914 |
| 1,342,412 | Armington | June 8, 1920 |
| 1,375,882 | Wilson | Apr. 26, 1921 |
| 1,422,380 | Schneider | July 11, 1922 |
| 1,488,629 | Wick | Apr. 1, 1924 |
| 1,534,297 | Carey | Apr. 21, 1925 |
| 1,659,018 | Clark | Feb. 14, 1928 |
| 1,803,014 | Hall | Apr. 28, 1931 |
| 1,817,028 | Brockway | Aug. 4, 1931 |
| 2,187,658 | Lane | Jan. 16, 1940 |
| 2,219,884 | Baker et al. | Oct. 29, 1940 |
| 2,271,849 | Wallace | Feb. 3, 1942 |
| 2,339,334 | Heaslet | Jan. 18, 1944 |
| 2,352,593 | Allin | July 4, 1944 |
| 2,416,478 | Harbers | Feb. 25, 1947 |
| 2,471,429 | Hawkins | May 31, 1949 |
| 2,488,805 | Clark et al. | Nov. 22, 1949 |

FOREIGN PATENTS

| Number | Country | Date |
|---|---|---|
| 698,144 | France | Nov. 17, 1930 |
| 56,298 | Denmark | June 12, 1939 |
| 401,310 | Germany | Aug. 30, 1924 |
| 119,132 | Great Britain | Sept. 26, 1918 |
| 186,907 | Great Britain | Feb. 1, 1923 |
| 572,240 | Great Britain | Sept. 28, 1945 |
| 584,858 | Great Britain | Jan. 24, 1947 |